(12) United States Patent
Parkinson et al.

(10) Patent No.: US 11,572,030 B1
(45) Date of Patent: Feb. 7, 2023

(54) AIRBAG INFLATOR ASSEMBLY

(71) Applicant: AUTOLIV ASP, INC., Ogden, UT (US)

(72) Inventors: David Walker Parkinson, Ogden, UT (US); Matt Cox, Centerville, UT (US); Louis A. Mueller, Roy, UT (US); Nathaniel Lee Gerlach, Kaysville, UT (US); Terry Alan Wheelwright, Morgan, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 17/469,326

(22) Filed: Sep. 8, 2021

(51) Int. Cl.
  *B60R 21/262* (2011.01)
  *B60R 21/26* (2011.01)
(52) U.S. Cl.
  CPC ............ *B60R 21/262* (2013.01); *B60R 21/26* (2013.01)
(58) Field of Classification Search
  CPC .................................................. B60R 21/262
  See application file for complete search history.

(56) References Cited

U.S. PATENT DOCUMENTS

| | | | | |
|---|---|---|---|---|
| 5,398,967 A | * | 3/1995 | Carothers | B60R 21/2644 280/741 |
| 5,407,226 A | * | 4/1995 | Lauritzen | B60R 21/276 280/739 |
| 5,433,471 A | * | 7/1995 | Shepherd | B60R 21/2171 280/732 |
| 5,458,364 A | * | 10/1995 | Mueller | B60R 21/2171 280/736 |
| 5,533,747 A | * | 7/1996 | Rose | B60R 21/2171 280/732 |
| 5,544,911 A | * | 8/1996 | Vine | B60R 21/261 280/740 |
| 5,566,975 A | * | 10/1996 | Stull | B60R 21/2171 280/739 |
| 5,613,704 A | * | 3/1997 | White, Jr | B60R 21/2176 280/740 |
| 5,634,657 A | * | 6/1997 | Rose | B60R 21/2171 280/740 |
| 5,785,348 A | * | 7/1998 | Donovan | B60R 21/26 280/736 |
| 5,791,680 A | * | 8/1998 | Dyer | B60R 21/2171 280/732 |

(Continued)

FOREIGN PATENT DOCUMENTS

EP    0698532 A1 * 10/1994
EP    0620140 A1 *  2/1996
(Continued)

*Primary Examiner* — Nicole T Verley
(74) *Attorney, Agent, or Firm* — Dickinson Wright PLLC (57) ABSTRACT

An inflator assembly arranged in an airbag system for use in a vehicle includes an elongated inflator with at least one mounting stud for mounting the inflator assembly in the vehicle and a gas deflector having a back plate and a front cover with at least one opening to diffuse gas generated from the inflator. The front cover is slid on the back plate along a longitudinal axis of the inflator such that the front cover is slidably engaged with the back plate to enclose a portion of the inflator. Further, the front cover and the back plate are securely engaged with each other by a crimp process to prevent opening or deforming of the gas deflector.

14 Claims, 7 Drawing Sheets

(56) References Cited

U.S. PATENT DOCUMENTS

| | | | | |
|---|---|---|---|---|
| 5,833,264 | A * | 11/1998 | Honda | B60R 21/2644 |
| | | | | 280/740 |
| 9,061,652 | B2 * | 6/2015 | Acker | B60R 21/261 |
| 9,376,082 | B2 * | 6/2016 | Osterfeld | B60R 21/2176 |
| 10,913,423 | B2 * | 2/2021 | Williams | B60R 21/26 |
| 2005/0194771 | A1 * | 9/2005 | Clark | B60R 21/261 |
| | | | | 280/736 |
| 2021/0170984 | A1 * | 6/2021 | Mueller | B60R 21/264 |

FOREIGN PATENT DOCUMENTS

| | | | | | |
|---|---|---|---|---|---|
| JP | 3020086 | U | * | 1/1996 | |
| JP | 2603438 | B2 | * | 4/1997 | |
| WO | WO-2004041599 | A1 | * | 5/2004 | F42B 3/121 |

* cited by examiner

AIRBAG INFLATOR ASSEMBLY

TECHNICAL FIELD

This present disclosure relates generally to an airbag system for protecting an occupant of a vehicle, and more particularly to an airbag inflator with a gas deflector to inflate the airbag cushion.

BACKGROUND

The statements in this section merely provide background information related to the present disclosure and may not constitute prior art.

Inflatable airbag systems are widely used to minimize occupant injury in a collision scenario. Airbag modules have been installed at various locations within a vehicle, including, but not limited to, the steering wheel, the instrument panel, within the side doors or side of seats, adjacent the roof rail of the vehicle, in an overhead position, or at the knee or leg position. Airbag modules typically comprise an airbag cushion, an inflator, an inflator housing, and an airbag housing. Present common designs can be grouped into two categories: a first category of airbags using a pancake or disc shaped inflator housing typically employed in steering wheels; and a second category using elongated inflators typically employed, for example, as passenger side frontal impact airbags. In each case, the inflator is typically machine-press fitted into the inflator housing, which is often made of steel or some other metals. The inflator and inflator housing are typically mounted within the airbag housing using mounting hardware integrated into, or provided by the inflator housing. The inflator assembly is positioned so that upon triggering of the inflator by vehicle collision sensors, inflation gas will be directed into the airbag cushion, causing it to rapidly expand.

Figure 1:
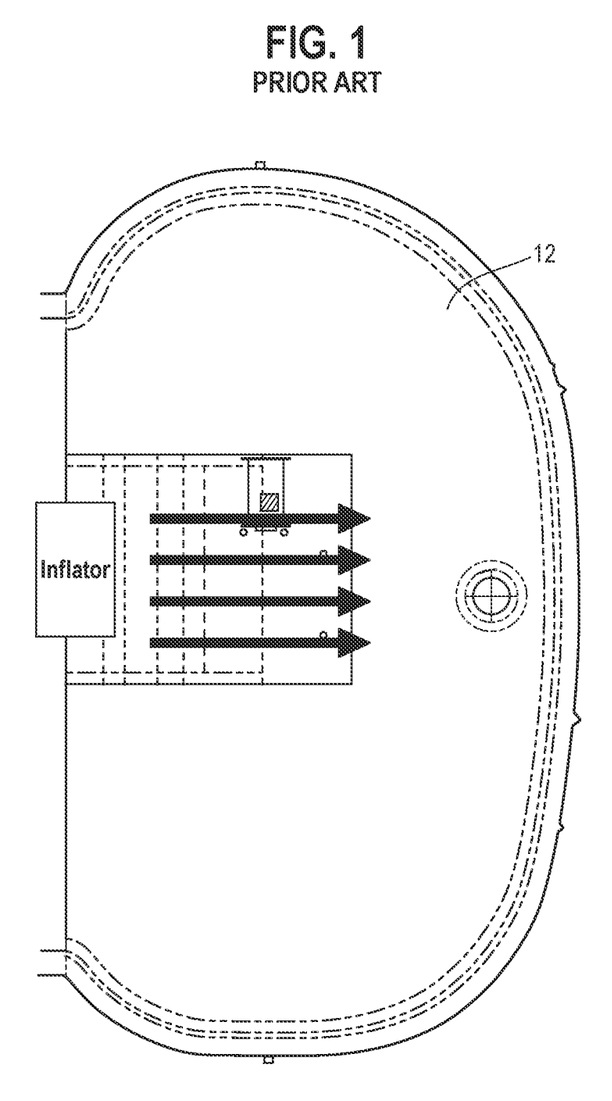
FIG. 1 is a plan view of a deployed airbag with a conventional inflator assembly as a prior art.

Generally, referring to tubular type inflators, the inflator assembly is installed inside the airbag cushion of the airbag module and usually a diffuser component is required. Gas which fills the airbag cushion is generated by the ignition of gas generant within the inflator. The gas is created from the rapid burning of pyrotechnic materials, and escapes exit ports formed in the inflator at a high velocity and temperature such that on actuation of the inflator, typically, the gas flows with extremely hot and fast in a direct outward direction as shown in FIG. 1. In FIG. 1, the combination of heat and speed during a deployment results in a snap load as the airbag cushion 12 moves into a position. There is a concern in the design of airbag system that the loading can result in failure of the airbag cushion by breaking perimeter seams, tearing the main panel, etc. For example, the loading could cause the gas to burn one or more holes in the airbag cushion material, which is generally a nylon or polyester weave such that the holes could cause the airbag cushion to inflate improperly. Accordingly, it is most desirable for gas from the inflator to flow into the airbag cushion with a flow direction which can be dispersed.

In the design of high-volume motor vehicle components, ease of assembly and low cost production designs are necessary. Accordingly, there is always a desire to achieve these goals in the design of automotive components while providing necessary and desired performance characteristics.

SUMMARY

The present disclosure relates to an inflator assembly arranged in an airbag system for use in a vehicle. The inflator assembly of the present disclosure includes an inflator and a gas deflector enclosing a gas exit portion of the inflator such that the gas deflector assembled with two pieces is configured to diffuse, cool, and direct gas generated from the inflator when the gas exits the inflator. Cooling and directing the gas appropriately reduces the snap loading on the airbag cushion and in turn, increases the robustness of the airbag cushion. This increased robustness may allow contents (seam protection, reinforcement, etc.) to be removed from the airbag cushion without increasing the risk of cushion damage thus reducing the cost, weight, and complexity of the cushion.

Further, the gas deflector assembled by the back plate and the front cover wraps all the way around the inflator such that it provides strength to prevent opening or deforming of the gas deflector as well as reduces weight and cost of the airbag assembly. In addition, since the gas deflector of the present disclosure is assembled by two pieces such as the front cover and the back plate, the front cover with the diffuser holes can be flipped up or down to slide onto the back plate such that the diffuser holes of the front cover is oriented to adapt for a left-hand airbag cushion or a right-hand airbag cushion. Accordingly, the same components of the gas deflector can be used for the left-hand airbag cushion and also the right-hand airbag cushion such that it further reduces cost of the airbag assembly in the vehicle.

In accordance with an exemplary embodiment of the present disclosure, the inflator assembly includes an elongated inflator with at least one mounting stud for mounting the inflator assembly in the vehicle and a gas deflector including a back plate and a front cover with at least one opening to diffuse gas generated from the inflator. The front cover having longitudinal edges is slid onto the back plate having side edges along a longitudinal axis of the inflator such that the longitudinal edges of the front cover are slidably engaged with the side edges of the back plate to enclose a portion of the inflator.

In accordance with a further aspect of the present disclosure, the back plate of the gas deflector has the side edges defined along the longitudinal axis of the inflator and each of the side edges is folded to form a J-hook shape. The front cover of the gas deflector is formed with a curved shape along an outer surface of the inflator and includes the longitudinal edges folded to form a J-hook shape along the longitudinal axis of the inflator. The longitudinal edges of the front cover are slidably and securely engaged with the side edges of the back plate along the longitudinal axis of the inflator such that the gas deflector assembled by the front cover and the back plate is formed as a tubular housing. Further, the tubular housing encloses a gas exit portion of the inflator having gas outlet apertures.

In accordance with a further aspect of the present disclosure, the engaged side edges and longitudinal edges are crimped to fixedly attach each other for preventing the separation of the front cover and the back plate.

In accordance with a further aspect of the present disclosure, the back plate of the gas deflector includes at least one stud hole for placing over the mounting stud of the inflator and is formed with a curved shape along an outer surface of the inflator having a cylindrical shape. The stud hole of the back plate receives the mounting stud close to a gas exit portion of the inflator.

In accordance with a further aspect of the present disclosure, the at least one opening of the front cover includes a plurality of holes and/or at least one slot to diffuse gas generated from the inflator. The plurality of holes formed in the front cover are arranged in a regular pattern such as a honeycomb type.

In accordance with a further aspect of the present disclosure, a method for fabricating an inflator assembly arranged in an airbag system for use in a vehicle, the method includes the steps of providing an elongated inflator having at least one mounting stud, placing a back plate formed with at least one stud hole over the mounting stud of the inflator, and sliding the front cover onto the back plate to form a tubular housing enclosing a portion of the inflator. The method further includes the step of crimping the coupled (engaged) edges of the front cover and the back plate to fixedly attach each other.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
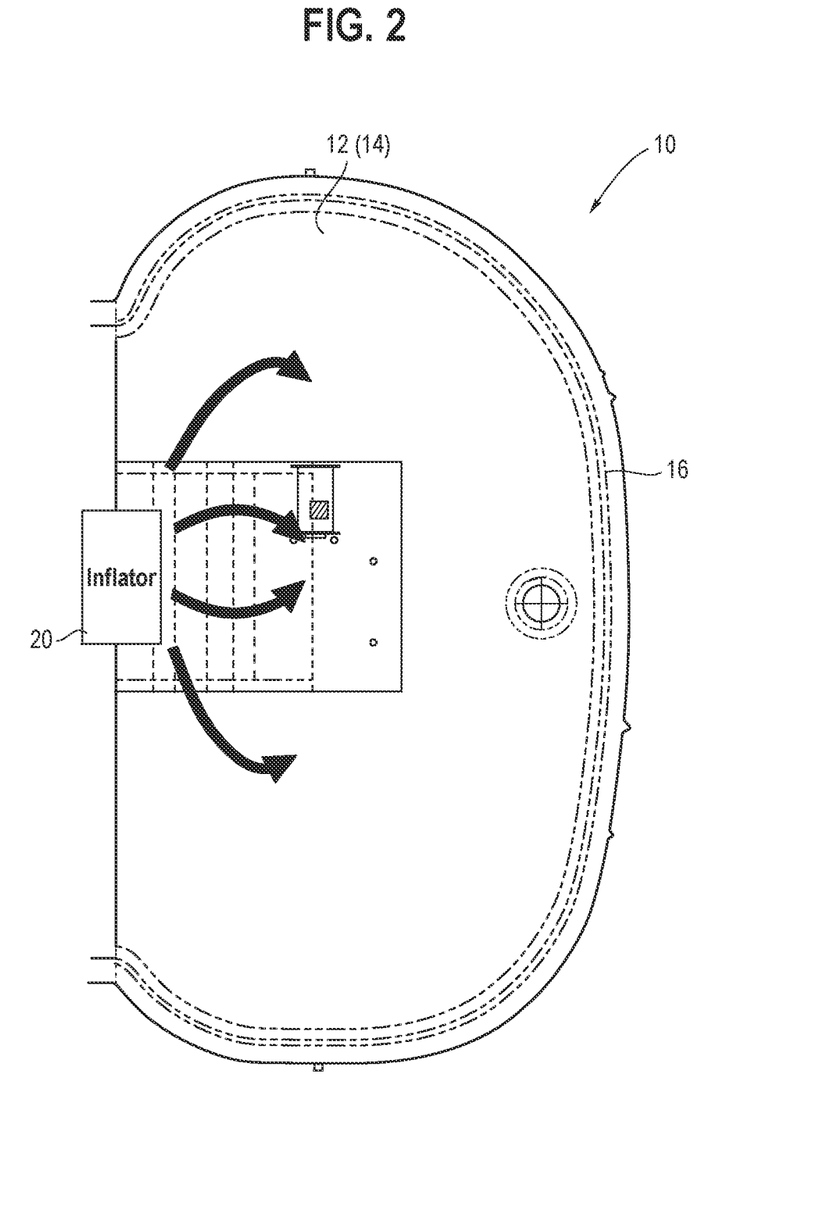
FIG. 2 is a plan view of a deployed airbag with an inflator assembly in accordance with an exemplary embodiment of the present disclosure.

FIG. 2 shows an airbag assembly 10 (in a deployed state) intended to be mounted in a position of a vehicle. Generally, the airbag assembly 10 (in a folded state) is mounted in a side of the vehicle seat (a side airbag) or a front side of the vehicle (e.g., an instrument panel or a steering wheel). The airbag assembly 10 includes an airbag cushion 12 generally formed from two super-imposed layers of the fabric 14, which, in the present disclosure, are interconnected by a notional fold or hinge line. As shown in FIG. 2, the layers of fabric 14 are of the same shape and size, and the layers are folded about the notional fold line and are interconnected by means of a seam 16. The seam 16 extends around the periphery of the super-imposed layers 14.

Figure 3:
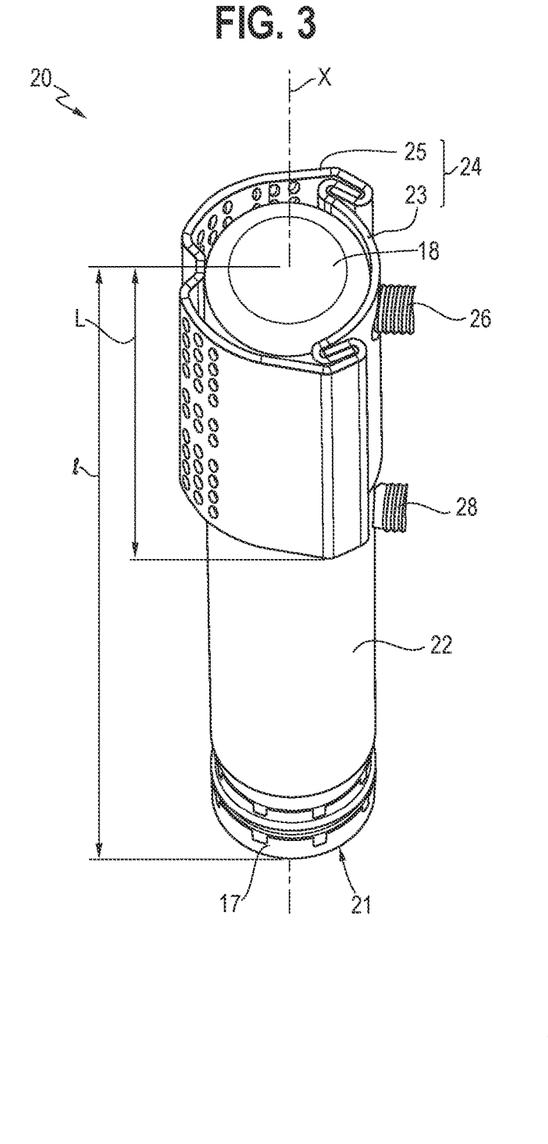
FIG. 3 is a perspective view of the inflator assembly having an inflator and a gas deflector of FIG. 2.

Referring to FIGS. 2 and 3, the airbag assembly 10 further includes an inflator assembly 20 having an elongated inflator 22 as a gas generator, and a gas deflector 24 (as will be described in greater detail below), which is introduced to the interior of the airbag cushion 12. As shown in FIG. 3, the inflator assembly 20 is provided with two protruding mounting studs 26 and 28 enabling the inflator assembly 20 together with the complete airbag assembly 10 to be mounted in position in the motor vehicle.

Figure 3A:
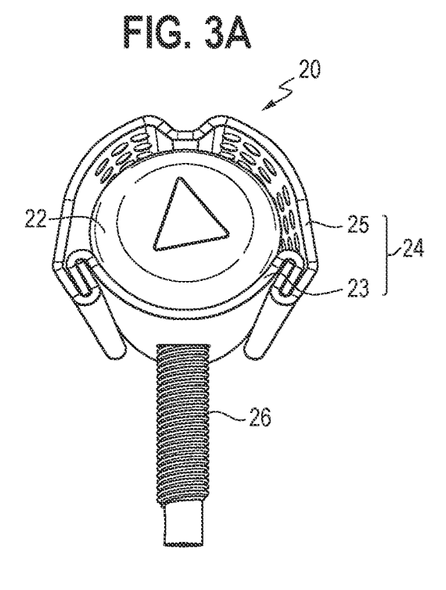
FIG. 3A is a top view of the inflator assembly of FIG. 3.

In FIGS. 3 and 3A, the inflator assembly 20 includes the inflator 22 formed in a cylindrical shape. An end 17 of the cylindrical inflator 22 is provided with a plug 21, which can receive an appropriate connector so that an electrical signal may be passed to the inflator 22 to actuate the inflator 22 in a manner which is well known. The inflator 22 is also provided, at the other end 18, with a plurality of gas outlet apertures (not shown) as a gas exit portion. In another approach, the gas outlet apertures can be located at middle location between both ends 17 and 18 of the inflator 22. The inflator assembly 20 further includes the gas deflector 24 which is of generally hollow cylindrical form and tubular housing to accommodate the cylindrical inflator 22. Further, as shown in FIGS. 3 and 3A of the present disclosure, the gas deflector 24 is formed with two pieces such as a back plate 23 and a front cover 25, which are formed as the tubular housing receiving the inflator 22. Accordingly, each of the back plate 23 and the front cover 25 is formed with a curved shape and they are coupled to each other for enclosing the cylindrical inflator 22.

Figure 4:
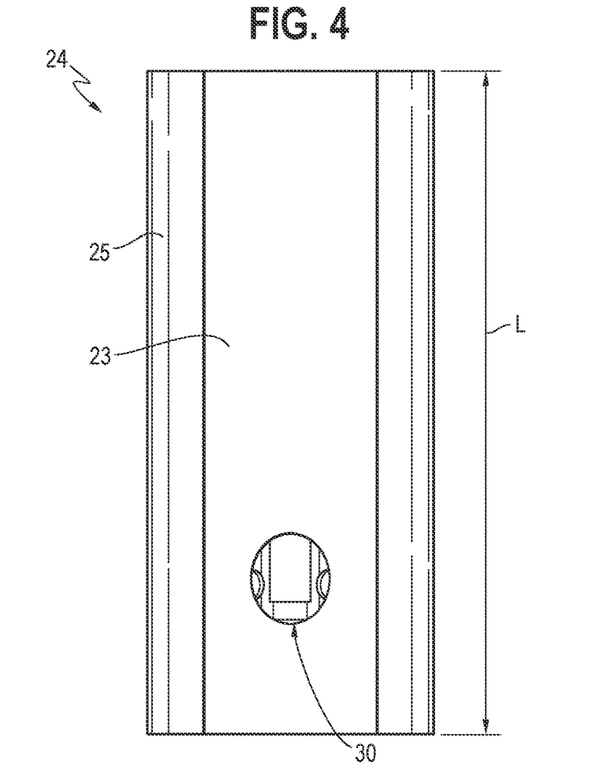
FIG. 4 is a rear view of the gas deflector of FIG. 3, FIGS. 4A and 4B are perspective views of the gas deflector of FIG. 3.
Figure 4A:
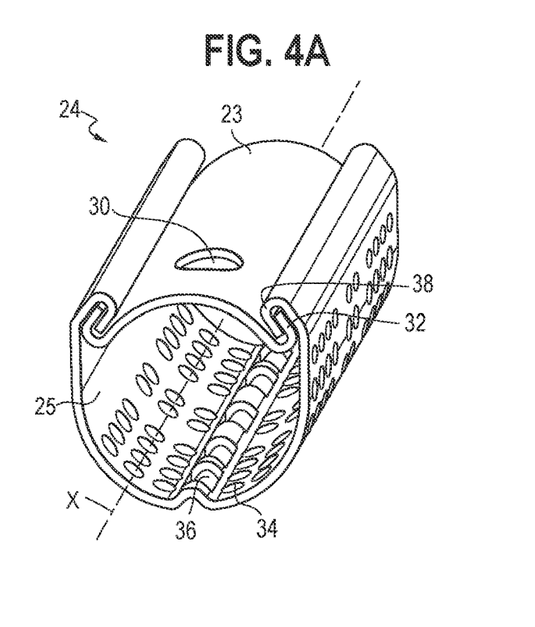
Figure 4B:
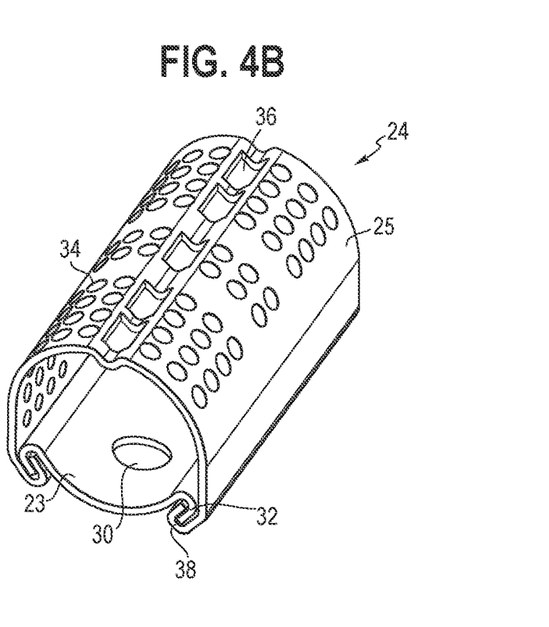

FIGS. 4, 4A, and 4B shows the gas deflector 24, which is formed with two pieces having the back plate 23 and the front cover 25. The back plate 23 includes a stud hole 30 for receiving one of the protruding mounting studs 26 and 28 of the inflator 22 such that the back plate 23 is securely placed on the inflator 22. In another approach, the back plate 23 may include two stud holes for receiving both protruding mounting studs 26 and 28 of the inflator 22 (not shown). In FIG. 3, the length L of the gas deflector 24 is shorter than the length l of the inflator 22 in a longitudinal axis X of the inflator. In another approach, however, the length of the gas deflector 24 may be equal to the length of the inflator 22 in the longitudinal axis X of the inflator 22. Further, the back plate 23 includes both side edges 32 defined along the longitudinal axis X of the inflator 24, and each of the side edges 32 is folded to have a J-shape (e.g., J-hook type) as shown in FIGS. 4A and 4B. Accordingly, the side edges 32 formed with the J-hook type are slidably engaged with the front cover 23 to form a tubular housing.

Figure 4C:
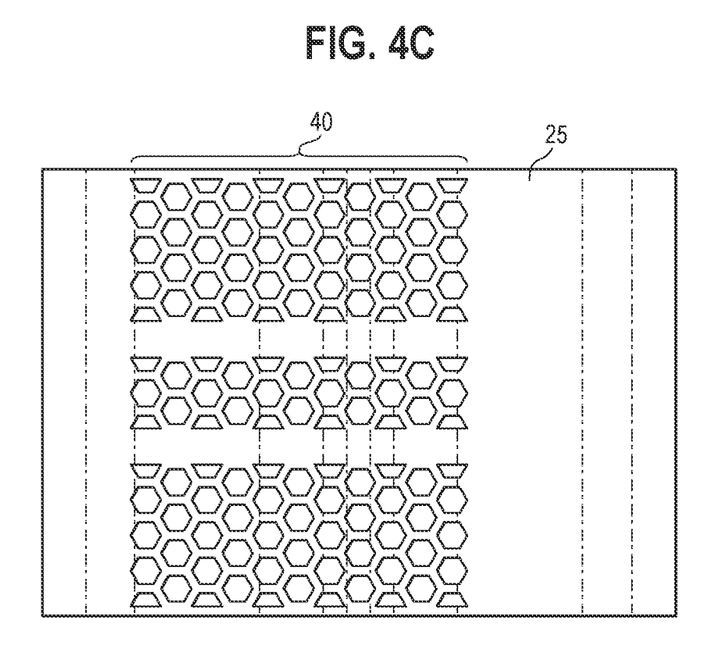
FIG. 4C is a plan view of a gas deflector having a plurality of holes arranged in a regular pattern in accordance with another embodiment of the present disclosure.

In addition, the front cover 25 of the gas deflector 24 is generally formed with at least one opening for the gas flow. In FIGS. 4A and 4B, the opening of the front cover 25 is formed with a plurality of holes 34 and/or at least one slot 36 for the gas flow generated from the inflator 22. The plurality of holes 34 and the slots 36 are generally formed in the front cover 25 with an irregular pattern and/or a regular pattern. For example, in FIG. 4B, a couple of slots 36 are arranged along the longitudinal axis X of the inflator 22 and the plurality of holes 34 are also arranged on both sides of the slots 36. In another approach, the plurality of holes 36 are arranged in a regular pattern such as a honeycomb type 40 (see FIG. 4C). However, the front cover 25 may be formed with any types of the opening for facilitating the gas flow generated from the inflator 22. Further, the front cover 25 having a plurality of holes 34 and/or the slots 36 is configured to diffuse, cool, and direct the gas when the gas exits the inflator 22.

As shown in FIGS. 4A and 4B, the front cover 25 of the gas deflector 24 further includes longitudinal edges 38 along the longitudinal axis X of the inflator 22. The longitudinal edges 38 of the front cover 25 are each formed with a J-shape (e.g., J-hook type) to be sized to fit into the side edges 32 of the back plate 23 such that the longitudinal edges 38 of the front cover 25 are slidably engaged with the side edges 32 of the back plate 23. Accordingly, the back plate 23 and the front cover 25 are assembled to form the gas deflector 24 as a single tubular housing. Further, the gas deflector 24 encloses at least a portion of the inflator 22 having the gas outlet apertures to exit the gas generated from the inflator 22. The gas deflector 24 formed with the back plate 23 and the front cover 25 is of substantially circular cross-section such that the internal diameter D of the gas deflector 24 is slightly greater than the external diameter d of the cylindrical inflator 22 (see FIG. 5C).

Due to the plurality of holes 34 and/or slots 36 formed in the front cover 25, the gas deflector 24 disperses the gas generated from the inflator 22 as shown in FIG. 2. Dispersing the gas allows the gas to expand and cool. In particular, the gas deflector 24 includes the front cover 25 having the surface which further allows the gas to transfer some of its heat. In addition, the back plate 23 and the front cover 25 are preferably made of a metal such as steel, copper, aluminum, or the like. Accordingly, once the gas passes through the gas deflector 24, the gas is sufficiently cooled and/or not concentrated to prevent burning holes in the airbag cushion 12. It is thus to be understood that on actuation of the inflator 22, the gas will flow outwardly through the gas outlet apertures into the interior of the gas deflector 24. As shown in FIG. 2, gas will then flow outwardly radially through the plurality of holes 34 and/or the slots 36 formed in the front cover 25 in addition to both ends of the gas deflector 24.

Referring back to FIG. 2, the gas deflector 24 installed in the inflator assembly 20 of the present disclosure is configured to diffuse and cool the gas when the gas exits the inflator 22. Cooling and diffusing the gas appropriately reduces the snap loading on the airbag cushion 12 and in turn, increases the robustness of the airbag cushion. This increased robustness may allow contents (seam protection, reinforcement, etc.) to be removed from the airbag cushion without increasing the risk of cushion damage thus reducing the cost, weight, and complexity of the cushion. Further, the gas deflector 24 assembled by two pieces such as the back plate 23 and the front cover 25 wraps all the way around the inflator 22 such that it provides strength to prevent opening or deforming of the gas deflector 24 as well as reduces weight and cost of the airbag assembly 10.

Figure 5A:
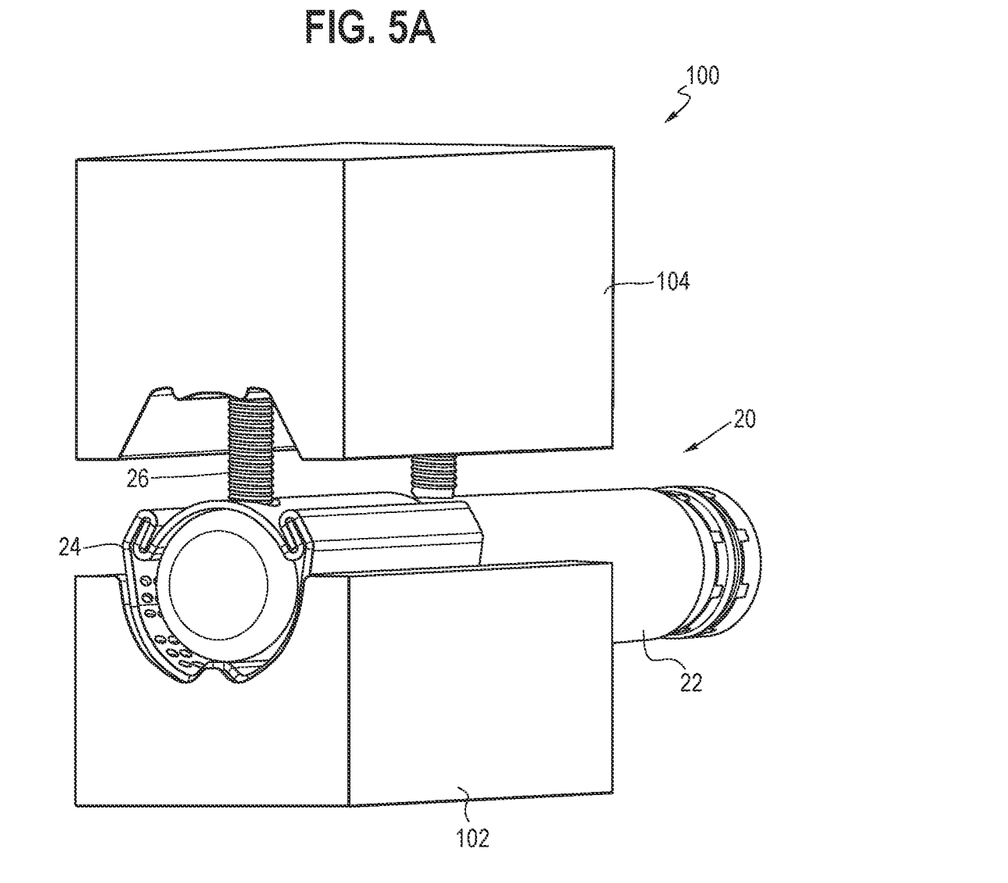
FIG. 5A is a perspective view of an assembly process for the inflator assembly with a crimping tool.
Figure 5B:
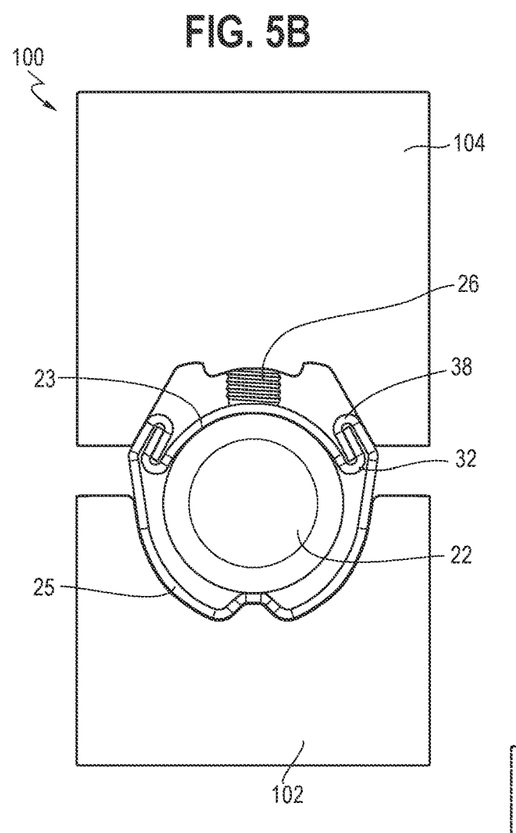
FIG. 5B is a top view of the assembly process of FIG. 5A.
Figure 5C:
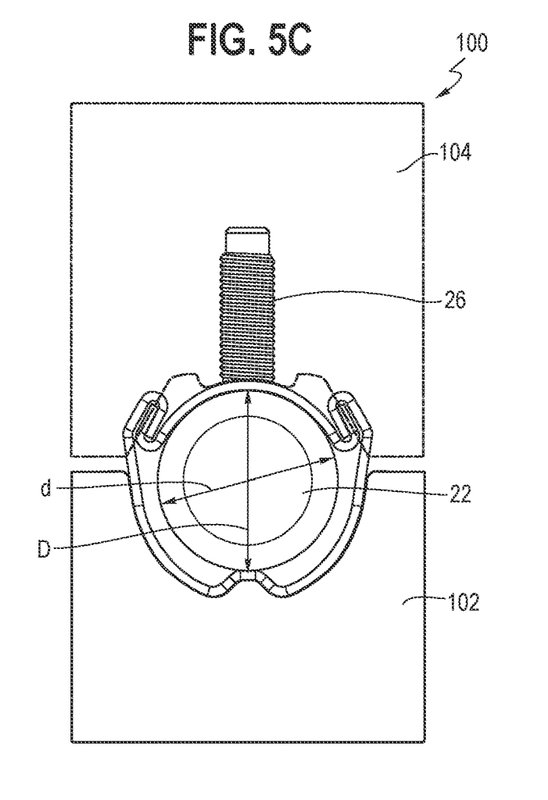
FIG. 5C is a cross-sectional view of the assembly process of FIG. 5B.

FIGS. 5A-5C illustrate a process for fabricating the inflator assembly 20 having the inflator 22 and the gas deflector 24 within the scope of the present disclosure. For example, FIGS. 5A-5C show a crimping tool 100 for fabricating the gas deflector 24 over the inflator 22. According to an exemplary method of the present disclosure, the inflator 22 is provided and the back plate 23 having the stud hole 30 is placed over the at least one of the mounting studs 26 and 28 of the inflator 22. As described above, the back plate 23 formed with a curved shape has the side edges 32 along the longitudinal axis X of the inflator 22, and the side edges 32 of the back plate 23 are formed with the J-hook shape for slidably engaging the front cover 25. As shown in FIGS. 5A-5C, the front cover 25 also has the longitudinal edges 38, which are formed with J-hook shape such that the longitudinal edges 38 of the front cover 25 is slid onto the side edges 32 of the back plate 23 from an end of the back plate 23.

Further, the back plate 23 and the front cover 25 are formed as a tubular housing, which encloses a portion of the inflator 22 (e.g., the gas exit portion). In FIG. 5A, the gas deflector 24 enclosing the inflator 22 is placed on a base die 102 of the crimping tool 100. In FIG. 5B, a top die 104 having holes for locating the mounting studs 26 and 28 of the inflator is lowered such that the J-hooks of both side and longitudinal edges 32 and 38 are pressed against each other, which are crimped (see also FIG. 5C). Accordingly, the crimping process of the present disclosure provides strength to prevent the separation of the front cover 25 and the back plate 23 when the gas is generated from the inflator 22 such that it avoids the opening (or breaking) or deforming of the gas deflector 24. In another approach, however, the gas deflector 24 may be assembled by other manufacturing processes such as bonding processes including a welding method.

While the above description constitutes the preferred embodiments of the present invention, it will be appreciated that the invention is susceptible to modification, variation and change without departing from the proper scope and fair meaning of the accompanying claims.

What is claimed is:

1. An inflator assembly arranged in an airbag system for use in a vehicle, the inflator assembly comprising:
    an elongated inflator with at least one mounting stud for mounting the inflator assembly in the vehicle; and
    a gas deflector including a back plate and a front cover with at least one opening to diffuse gas generated from the inflator,
    wherein the front cover is formed with longitudinal edges at both lateral ends parallel to a longitudinal axis of the inflator and the back plate is formed with side edges at both lateral ends parallel to the longitudinal axis of the inflator, and
    wherein the longitudinal edges of the front cover and the side edges of the back plate are configured to be pressed against each other such that the longitudinal edges of the front cover and the side edges of the back plate are fixedly attached to each other.

2. The inflator assembly of claim 1, wherein the side edges of the back plate defined along the longitudinal axis of the inflator are folded to form a J-hook shape.

3. The inflator assembly of claim 2, wherein the longitudinal edges of the front cover defined along the longitudinal axis of the inflator are folded to form a J-hook shape.

4. The inflator assembly of claim 1, wherein the gas deflector assembled by the front cover and the back plate is formed as a tubular housing to enclose a portion of the inflator.

5. The inflator assembly of claim 4, wherein the engaged side edges and longitudinal edges are crimped to fixedly attach each other for preventing the separation of the front cover and the back plate.

6. The inflator assembly of claim 4, wherein the tubular housing assembled by the front cover and the back plate encloses a gas exit portion of the inflator having gas outlet apertures.

7. The inflator assembly of claim 1, wherein the back plate of the gas deflector includes at least one stud hole for placing over the mounting stud of the inflator and is formed with a curved shape along an outer surface of the inflator having a cylindrical shape.

8. The inflator assembly of claim 7, wherein the stud hole of the back plate receives the mounting stud close to a gas exit portion of the inflator.

9. The inflator assembly of claim 1, wherein the at least one opening of the front cover includes a plurality of holes and/or at least one slot to diffuse gas generated from the inflator.

10. The inflator assembly of claim 9, wherein the plurality of holes formed in the front cover are arranged in a regular pattern such as a honeycomb type.

11. A method for fabricating an inflator assembly arranged in an airbag system for use in a vehicle, the method comprising the steps of:
   providing an elongated inflator having at least one mounting stud;
   placing a back plate formed with at least one stud hole over the mounting stud of the inflator;
   sliding a front cover onto the back plate to form a tubular housing enclosing a portion of the inflator along a longitudinal axis of the inflator; and
   crimping longitudinal edges formed in lateral ends of the front cover and side edges formed in lateral ends of the back plate to be fixedly attached to each other.

12. The method of claim 11, wherein the side edges are formed with a J-hook type and the longitudinal edges are formed with a J-hook type.

13. The method of claim 11, wherein the front cover is formed with at least one opening configured to diffuse gas generated from the inflator.

14. The method of claim 13, wherein the at least one opening includes a plurality of holes and/or at least one slot formed in the front cover.

\* \* \* \* \*